(12) United States Patent
Pinsker et al.

(10) Patent No.: US 12,253,827 B2
(45) Date of Patent: Mar. 18, 2025

(54) METHOD FOR PRODUCING A HOLOGRAM ON A CURVED SUBSTRATE PLATE, RESULTING SUBSTRATE PLATE WITH HOLOGRAM AND A LAMINATE, IN PARTICULAR A VEHICLE WINDSCREEN, CONTAINING SAID SUBSTRATE PLATE

(71) Applicant: Bayerische Motoren Werke Aktiengesellschaft, Munich (DE)

(72) Inventors: Martin Pinsker, Bruckberg (DE); Tobias Solchenbach, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 293 days.

(21) Appl. No.: 17/774,589

(22) PCT Filed: Oct. 27, 2020

(86) PCT No.: PCT/EP2020/080107
§ 371 (c)(1),
(2) Date: May 5, 2022

(87) PCT Pub. No.: WO2021/089362
PCT Pub. Date: May 14, 2021

(65) Prior Publication Data
US 2022/0397861 A1 Dec. 15, 2022

(30) Foreign Application Priority Data
Nov. 7, 2019 (DE) ...................... 10 2019 130 021.5

(51) Int. Cl.
*G03H 1/20* (2006.01)
*B29C 43/12* (2006.01)
(Continued)

(52) U.S. Cl.
CPC ............. *G03H 1/202* (2013.01); *B29C 43/12* (2013.01); *B29C 43/3642* (2013.01);
(Continued)

(58) Field of Classification Search
CPC ....................................... G03H 1/202
See application file for complete search history.

(56) References Cited

U.S. PATENT DOCUMENTS 4,998,784 A 3/1991 Freeman et al.
5,227,176 A * 7/1993 McIntyre-Major .......................... B29C 33/3821
249/82

(Continued)

FOREIGN PATENT DOCUMENTS

CN 1675596 A 9/2005
CN 102768182 A 11/2012
(Continued)

OTHER PUBLICATIONS

Machine translation DE102015220123A1 (Year: 2017).*
(Continued)

*Primary Examiner* — Jacob T Minskey
*Assistant Examiner* — Wayne K. Swier
(74) *Attorney, Agent, or Firm* — Crowell & Moring LLP

(57) ABSTRACT

A method for producing a hologram on a curved substrate plate includes providing a curved substrate plate having a substrate surface, the actual geometry of which is subject to a tolerance deviation with respect to a predetermined desired geometry; providing an inflatable cushion with a cushion surface that can be deformed under the effect of pressure and is preformed into the predetermined desired geometry or with a predetermined deviation therefrom; applying a holographic master in the form of a flexible thin layer to the deformable cushion surface and applying a hologram-re-
(Continued)

cording layer to the substrate surface; pressing or placing the holographic master onto the hologram-recording layer by way of the cushion surface deformed to the actual geometry, thereby achieving full surface-area contact between them with a substantially constant predetermined layer thickness of the hologram-recording layer, and exposing the hologram-recording layer to form a hologram.

19 Claims, 3 Drawing Sheets

(51) Int. Cl.
    *B29C 43/32*    (2006.01)
    *B29C 43/36*    (2006.01)
    *B29C 43/52*    (2006.01)
    *B29L 31/00*    (2006.01)
    *B29L 31/30*    (2006.01)
    *G03H 1/02*    (2006.01)

(52) U.S. Cl.
    CPC .......... B29C 43/52 (2013.01); G03H 1/0248 (2013.01); *B29C 2043/3238* (2013.01); *B29C 2043/3649* (2013.01); *B29C 2043/3655* (2013.01); *B29L 2031/3052* (2013.01); *B29L 2031/7224* (2013.01)

(56) References Cited

U.S. PATENT DOCUMENTS

| 9,285,588 | B2 | 3/2016 | Shikii et al. |
| 9,321,226 | B2 | 4/2016 | Poffet et al. |
| 2004/0036931 | A1* | 2/2004 | Edwards ................ G03H 1/02 |
| 2007/0153343 | A1 | 7/2007 | Blyth et al. |
| 2010/0112458 | A1 | 5/2010 | Knocke |
| 2010/0143525 | A1 | 6/2010 | Kuntz et al. |
| 2014/0242273 | A1 | 8/2014 | Poffet et al. |
| 2017/0045740 | A1 | 2/2017 | Hirata et al. |
| 2018/0052328 | A1 | 2/2018 | Holland et al. |
| 2019/0291498 | A1 | 9/2019 | Lister |

FOREIGN PATENT DOCUMENTS

| CN | 106233185 A | 12/2016 |
| CN | 108474873 A | 8/2018 |
| CN | 109116577 A | 1/2019 |
| CN | 109324412 A | 2/2019 |
| CN | 109641477 A | 4/2019 |
| DE | 10 2004 030 019 A1 | 1/2006 |
| DE | 10 2015 220 123 A1 | 4/2017 |
| WO | WO 2017/064245 A1 | 4/2017 |

OTHER PUBLICATIONS

English translation of Chinese-language Office Action issued in Chinese Application No. 202080075443.0 dated Feb. 1, 2024 (9 pages).
Cover Page of EP 3 362 857 A1 published Aug. 22, 2018 (1 Page).
International Search Report (PCT/ISA/210) issued in PCT Application No. PCT/EP2020/080107 dated Jan. 22, 2021 with English translation (five (5) pages).
German-language Written Opinion (PCT/ISA/237) issued in PCT Application No. PCT/EP2020/080107 dated Jan. 22, 2021 (five (5) pages).
German-language Search Report issued in German Application No. 10 2019 130 021.5 dated Jul. 1, 2020 with partial English translation (11 pages).

* cited by examiner

METHOD FOR PRODUCING A HOLOGRAM ON A CURVED SUBSTRATE PLATE, RESULTING SUBSTRATE PLATE WITH HOLOGRAM AND A LAMINATE, IN PARTICULAR A VEHICLE WINDSCREEN, CONTAINING SAID SUBSTRATE PLATE

BACKGROUND AND SUMMARY OF THE INVENTION

The invention relates, in general terms, to methods of producing a hologram, and is especially directed to the integration of a hologram between two curved panes in a pane composite, for example in a vehicle windowpane, and to a vehicle equipped therewith. The vehicle may be any land vehicle, aircraft or watercraft, especially a motor vehicle. The hologram may especially be a holographic optical element (HOE) which is to be integrated, for example, as an element of a head-up display in a vehicle windshield.

Head-up displays (HUDs) in a vehicle show display contents, for example a message about a speed limit or other navigation and vehicle operation instructions, in the form of a virtual display image superimposed on the real image of the environment in front of the vehicle which is observed by the driver. For this purpose, a head-up display generally comprises a projection unit incorporated into the dashboard that generates a projected light beam with the desired display contents and projects it onto the vehicle windshield, whence it is reflected back to the driver.

In order to largely save the driver from any adjustment of vision when changing the view between the road in front and the display to be read, the virtual display image is typically created at a certain distance from the vehicle. In order to achieve this and other imaging properties, projection units in head-up displays for the automotive sector are conventionally constructed by way of concave mirrors, but the size of these is proportional in a linear manner with the size of image of the virtual display image and a field of view (FoV) that can be covered thereby. In order to distinctly extend the field of view that can be covered, for example for a contact-analogous AR (augmented reality) display oriented to real objects in the environment, it would be necessary in the conventional HUD display mode to integrate a correspondingly large concave mirror in the dashboard, which leads to problems in respect of the available construction space in the vehicle interior or else in respect of the appearance thereof, since a correspondingly large opening would again be required for the exiting projection light beam in the dashboard.

To overcome such problems, there are known approaches for head-up display devices in motor vehicles that comprise integration into a vehicle windshield of a holographic optical element (HOE) which, for example, assumes the optical function of a concave mirror customary for the conventional projection unit. This enables a more compact HUD design without concave mirrors, which is also known as a holographic head-up display. In the approaches known from U.S. Pat. No. 4,998,784 A, a hologram is first produced as a flat film with requisite optical properties on a separate substrate and then laminated between two glass panes of a composite safety glass construction typical of vehicle windowpanes with the aid of a PVB (polyvinylbutyral) hotmelt adhesive that bonds them together.

In the lamination of such finished HOE films in a pane composite, however, they are subjected to high pressures and temperatures that have an adverse effect on the material properties and stability of the hologram. Furthermore, the laminating of a hologram produced as a flat film into a 3D-curved geometry of a vehicle windowpane is generally impossible without wrinkling or creasing of the HOE film. However, this considerably impairs the optical function of the hologram which is typically created prior to lamination, usually in a roll-to-roll process.

All attempts to laminate a material capable of recording a hologram, for instance in the form of a holographic film, into a composite glass prior to exposure and only then to expose a hologram or an HOE therein require significant interventions into the composite glass production process, and are barely implementable industrially on account of the demands of the exposure process, such as thermal stability, freedom from vibration, dark environment, etc.

On the other hand, especially for banknotes or ID documents, a hologram production method by production of what are called "contact copies" is known to be particularly viable for mass production. This involves applying a hologram recording layer of a photopolymer in liquid form to a substrate, for example a film or foil, and exposing it in reflection in direct contact with a master hologram (also called holography master) and hence copying it, i.e. replicating it. In other words, a holography master which is generally a surface hologram is used here for the repeated production of a hologram, which generally takes the form of a volume hologram in the photopolymer layer. Only in the exposure and subsequent fixing with UV light does the liquid photopolymer cure.

The layer thickness of the liquid photopolymer in this method has to be set with an accuracy of less than 10 micrometers. In this connection, geometric tolerances between the substrate and the holography master play a major role, since, firstly, the master has to be in contact with the photopolymer over the full area for the duration of the hologram recording and, secondly, the separation of master and substrate determines the said layer thickness of the photopolymer layer. In the case of a flat geometry, it is possible to precisely adjust the constant separations between a flat substrate and a flat holography master that are required for the hologram recording without difficulty, for instance in a roll-to-roll process. In known methods, the substrate generally takes the form of a flat film or a flat foil, i.e. a non-curved form, while the holography master is generally a rigid metallic component which is inflexible and hence cannot compensate for any substrate tolerances.

It is an object of the invention to solve the above problems by specifying an alternative or improved method of producing a hologram, which enables the integration thereof in a pane composite having three-dimensionally curved panes, especially in a vehicle windowpane. It is also an object of the invention to specify a corresponding pane composite and a vehicle equipped therewith.

This object is achieved by a method of producing a hologram on a curved substrate pane and a resulting curved substrate pane with a hologram produced by this method, a pane composite comprising the latter, especially a vehicle windowpane, and a vehicle equipped therewith. All further features and effects for the hologram production method are also applicable in relation to the substrate pane, the pane composite and the vehicle with a hologram thus produced, and vice versa.

In this context, the sequence in which the individual method steps are described should not be considered to be binding in each case, unless the opposite is mentioned. Instead, individual steps of the method set out herein, if suitable, may in each case also be executed in a different sequence than that described, in order to arrive at the same result mentioned. In this context, the sequence of performance may vary, for example according to the embodiment of the method and/or according to specific requirements of an application. Some examples in this regard are specified further down.

In a first aspect, a method of producing a hologram on a curved substrate pane is provided. The curved substrate pane may especially serve as a fixed constituent of a future component, for example a vehicle windowpane, which is to be equipped with a hologram, and therefore has a three-dimensionally curved geometric shape of this component that differs from a flat or planar geometry. The curved substrate pane may in principle be manufactured from any material suitable for the subsequent exposure of the hologram, for example from glass or plastic. It may thus especially be rigid.

The hologram is especially a holographic optical element (HOE) which is to be integrated in a windshield of the vehicle, for example as an element of a head-up display (HUD) of the type described at the outset, in order to assume the function of a concave mirror. Alternatively, other optical functions of the HOE created on the curved substrate pane are also achievable by the present hologram production method, for example an angle-selective diffuser hologram for representation of display contents directly on the resulting (vehicle) pane, which can thus serve as a kind of screen, or an outcoupling hologram for a waveguide HUD, in which a flat waveguide is formed in the windshield for display of contents. The vehicle may be any land vehicle, aircraft or watercraft, especially a motor vehicle.

This method comprises the following steps:
providing said three-dimensionally curved substrate pane which is tolerance-affected as part of the future component, especially a vehicle windowpane, and has a substrate surface intended for hologram production, the actual geometry of which is subject to a variance in tolerance compared to a predetermined target geometry;
providing an inflatable cushion with a cushion surface which is shapeable by the action of pressure and has been preshaped to the predetermined target geometry or with a predetermined variance therefrom, for example under- or overcambered;
applying a holography master which serves, for example, as a reusable negative of the hologram to be recorded, in the form of a flexible thin layer to the shapeable cushion surface;
applying a hologram recording layer, especially a liquid photopolymer layer, to the substrate surface;
pressing or laying the holography master onto the hologram recording layer by way of the cushion surface shaped to the actual geometry of the substrate surface, which achieves full-area contact between the holography master and the hologram recording layer with an essentially constant predetermined layer thickness of the hologram recording layer; and
fixing/holding this hologram recording arrangement for a predetermined exposure time required to record the hologram.

The hologram is then created by the exposure of the hologram recording layer in this hologram recording arrangement with a coherent light, for example on the reverse side through the substrate pane. More particularly, the holography master may take the form of a surface hologram. The hologram may especially take the form of a volume hologram in the hologram recording layer in that, as described, it is exposed and hence copied in reflection, i.e. replicated, in direct contact with the holography master. As well as its function as a hologram negative, the master held against the hologram recording layer can also contribute to assurance of the required freedom from vibration for the duration of the exposure, which, according to the application, may also be up to a few minutes. According to hologram recording material used, the hologram recording layer can subsequently be fixed, for example, with suitable incoherent light, for instance with UV light. Only on exposure and subsequent fixing with UV light is there curing, for example, of the liquid photopolymer. After the described completion of the hologram in the hologram recording layer, the master is removed therefrom again.

One concept of the present method is to press the holography master via the inflatable cushion onto the tolerance-affected actual geometry of the substrate pane, or onto the hologram recording layer applied in a thin layer thereon. This enables hologram production directly on a three-dimensionally curved substrate pane that forms part of a future component, such that the hologram is produced immediately in the ultimate geometry of the component and does not have to be subsequently laminated thereon and shaped, as in conventional methods mentioned at the outset. Moreover, the hologram in the present method is produced directly on the ultimate substrate that does not have to be removed later, and is thus additionally protected against any damage in the course of later handling in component production.

If the use of a glass pane intended for vehicle glazing, for example for the windshield, as substrate is desirable here, the curved rigid glass is generally subject to geometry tolerances of several tenths of a millimeter. However, the layer thickness of the hologram recording layer, especially of the liquid photopolymer, in the present hologram recording method should be established with an accuracy of less than 10 micrometers, i.e. 10 to 100 times more accurately than the typical geometry tolerance of a curved glass pane. This makes it important to balance the geometry tolerances between the substrate pane and the holography master, since, firstly, the master must be in contact with the hologram recording layer over its full area for the duration of hologram recording and, secondly, the separation of master and substrate pane determines the said layer thickness of the hologram recording layer.

Therefore, the holography master in the present method is designed to be applied flexibly and thinly to a preshaped cushion surface of the inflatable cushion, for instance a polymer or elastomer bubble, in order to be able to match the geometry tolerance of the substrate pane. The preshaped cushion surface already has the previously known/predetermined target geometry of the substrate pane or a form that varies from this target geometry in a defined manner, for example over- or undercambered.

In order to assure the above-described precise hologram recording arrangement, before or during the pressing/laying of the holography master onto the hologram recording layer, a geometry-balancing shaping of the said cushion surface from the previously known target geometry to the actual current geometry of every individual substrate pane is brought about, for example by pressing this cushion surface in a geometrically exact manner onto the actual geometry of the substrate pane. The inflatable cushion here may be designed as a single- or multichamber profile in order to simplify any deaeration.

Some examples are reported hereinafter for the accomplishment of this shaping of the preshaped cushion surface to the actual geometry.

More particularly, the shaping of the preshaped cushion surface to the actual geometry can be brought about or assisted during or after the laying or pressing of the cushion with the holography master applied thereto onto the hologram recording layer in that the preshaped cushion surface is pressed against the substrate surface with or without the hologram recording layer applied thereto with a compression force which is especially essentially constant over the entire shapeable cushion surface. The latter leads to uniform pressurization of the shapeable cushion surface, for example while it is adapted to the substrate surface with formation of full-area contact with the comparatively thin hologram recording layer thereon, as a result of which the shapeable cushion surface adopts the actual geometry thereof. In the case of a uniform pressure distribution over the deformable cushion surface, the capillary effect can especially also contribute to establishment of a completely constant layer thickness of the liquid photopolymer layer.

Alternatively or additionally, the shaping of the preshaped cushion surface to the actual geometry before, during or after the laying of the cushion with the holography master applied thereto onto the hologram recording layer can be brought about or assisted in that the cushion as a whole is pressed on the reverse side with a suitable force onto the substrate surface with or without the hologram recording layer applied thereto. The suitable compression force may be exerted on the reverse side of the cushion remote from the preshaped cushion surface, especially by way of any suitable mechanical apparatus, for example by way of a spring-loaded arm or a hydraulically actuated piston. This too can lead to homogeneous pressurization of the shapeable cushion surface while it is adapted to the substrate surface with formation of full-area contact with the comparatively thin hologram recording layer thereon, as a result of which the shapeable cushion surface adopts the actual geometry thereof. More particularly, the force mentioned may be distributed uniformly over the reverse side of the cushion, for instance by way of a suitable pressure plate which is pressed against the cushion by the force mentioned.

In a first embodiment, the inflatable cushion is filled with a fluid, especially air, and has at least one pressure regulation valve for adjustment of a fluid pressure in the cushion. The fluid may in principle be any desired gas, or else alternatively a liquid. The cushion is first provided with a predetermined first fluid pressure at which the deformable cushion surface has the abovementioned target geometry or a predetermined variance therefrom, for example under- or overcambered. The shaping of the cushion surface thus preshaped to the actual geometry of the substrate surface is brought about here by a change in fluid pressure in the cushion to a predetermined second pressure different from the first fluid pressure, while the cushion with the holography master applied thereto lies against the substrate surface with the hologram recording layer applied thereto or is pressed against it on the reverse side. This change in fluid pressure within the cushion, which is implemented, for example, by actuation of the pressure-regulating valve, results in uniform pressurization of the shapeable cushion surface, as a result of which it adapts to the comparatively thin hologram recording layer on the substrate surface and hence adopts the actual geometry of the substrate surface.

More particularly, in this embodiment, the predetermined first fluid pressure may be a reduced pressure or an elevated pressure in relation to the existing ambient pressure, especially atmospheric pressure, by way of which it is especially possible to provide undercambering or overcambering of the shapeable cushion surface relative to the target geometry. During or after placing or pressing of the cushion thus preshaped onto the substrate surface with the hologram recording layer applied thereto, the predetermined second fluid pressure is established therein, which, in this variant, is equal to the existing ambient pressure. This change in pressure, for example resulting from the opening of the pressure-regulating valve, enables or brings about the establishment of full-area contact of the shapeable cushion surface having the thin hologram recording layer with the substrate surface beneath, as a result of which the cushion surface adopts the target geometry thereof.

Other variants of the change in fluid pressure in the cushion may lead to the desired balancing of geometry in the first embodiment specified. For example, the predetermined first fluid pressure may correspond to the existing ambient pressure, especially atmospheric pressure, and the predetermined second fluid pressure may be a reduced pressure in relation thereto, while the cushion as a whole is being pressed against the hologram recording layer by a force on its reverse side.

In a second embodiment, the inflatable cushion is filled with a fluid, especially air or another gas or a liquid, and a solid-state material present or distributed therein, with the solid-state material being soft and deformable when the fluid is present in the cushion, and hardening when fluid is withdrawn from the cushion and maintaining a shape imparted thereto. For example, the cushion here, similarly to the immobilization technique known as vacuum splint material, may have a relatively loose filling of fine granules, especially polymer beads of suitable size, as a result of which the filling is soft and shapeable provided that there is air in the cushion, and hardens when air is withdrawn from the cushion, since the individual granule particles are pressed against one another by the reduced pressure. Alternatively, the filling may, for example, also be a suitable shapeable foamlike material which hardens and keeps its shape on evacuation. For the withdrawal of fluid from the cushion, it may have, for example, a suitable connection for a vacuum pump.

In this embodiment, the cushion is first provided with a cushion surface preshaped to the target geometry or a predetermined variance therefrom, for example under- or overcambered. For this purpose, it is especially possible to establish a predetermined fluid pressure in the cushion, for instance the existing ambient pressure or else an elevated or reduced pressure.

The shaping of the preshaped cushion surface to the actual geometry is brought about in the second embodiment by the pressing of the cushion with or without the holography master applied thereto on the reverse side onto the substrate surface with or without the hologram recording layer applied thereto, and fixing or freezing or preserving a shape imparted thereby to the shapeable cushion surface, namely the actual geometry of the substrate surface, by withdrawing fluid from the cushion of hardened solid-state material, and maintaining it in the performance of the other steps of the present hologram production method.

More particularly, in the method according to the second embodiment, in the step of shaping the preshaped cushion surface to the actual geometry and/or in the subsequent withdrawal of fluid from the cushion, the pressing of the cushion onto the substrate surface can be brought about or assisted by a force applied to the reverse side of the cushion. This compression force on the reverse side of the cushion may also be applied here, for example, by way of any suitable mechanical apparatus.

In a further aspect of the invention, a curved substrate pane with a hologram produced by the method of the type described herein is envisaged. The hologram may especially be a holographic optical element. This hologram has been recorded in a hologram recording layer applied to the said tolerance-affected curved substrate surface of the substrate pane, especially as a volume hologram, and the recording of the hologram has been brought about by the exposure of the hologram recording layer with a coherent light in a hologram recording arrangement of the type described above that exists at least for the duration of the exposure, in which a holography master in the form of a flexible thin layer is or was pressed onto the hologram recording layer with full-area contact between them and an essentially constant predetermined layer thickness of the hologram recording layer by way of an inflatable cushion with a cushion surface corresponding to the actual geometry of the substrate surface.

In a further aspect of the invention, a pane composite, especially a vehicle windowpane, is provided. The pane composite firstly comprises a curved substrate pane with a hologram of the type described above produced thereon as a first pane of the pane composite. The pane composite further comprises a second pane bonded to the first pane by an intervening bonding layer, especially of a hotmelt adhesive such as PVB (polyvinylbutyral), wherein the hologram is formed on a surface of the first pane facing the second pane. Said pane composite may therefore especially be a composite safety glass (VSG). Said bonding of the two layers of the pane may especially be implemented by a suitable lamination process of a type known per se.

In a further aspect of the invention, a vehicle having a vehicle windowpane at least partly formed by a pane composite of the type described above is provided. The vehicle may be any land vehicle, aircraft or watercraft, especially a motor vehicle. In this case, the abovementioned first pane of the composite on which the hologram is created by the method of the type set out herein is especially an inner pane of the vehicle windowpane closer to or directly adjoining a vehicle interior, while the second pane is an outer pane of the vehicle windowpane lying closer to or directly adjoining the outside environment of the vehicle. The vehicle windowpane may, but need not, also have further layers or panes on the inside or outside of the pane composite in addition to the two panes mentioned.

The hologram may especially be a holographic optical element (HOE) integrated in a windshield of the vehicle, for example as an element of a head-up display of the type described at the outset, in order, for instance, to assume the function of a concave mirror. Alternatively, the HOE may be equipped with a different optical function, for example as an angle-selective diffuser hologram for display of display contents directly on the vehicle windowpane, which can thus be used as a kind of screen, or as an outcoupling hologram for a waveguide HUD in which a flat waveguide is formed in the vehicle windowpane for display of contents for passengers of the vehicle.

The above aspects of the invention and of the embodiments and specific configurations are elucidated in detail hereinafter with reference to the examples shown in the appended drawings. The drawings are purely schematic; more particularly, they should not be regarded as being true to scale.

DETAILED DESCRIPTION OF THE DRAWINGS

All the different embodiments, variants and specific configuration features, mentioned further up in the description and in the claims that follow, of the method according to the first aspect of the invention for producing a hologram on a curved substrate pane and of the resulting substrate pane, of the pane composite and of the vehicle according to the further aspects of the invention may be implemented in the examples shown in FIGS. 1 to 3c. They will therefore not all be repeated once again hereinafter. The same is correspondingly true of the definitions of terms and effects already specified further up in relation to individual features that are shown in FIGS. 1-3c.

Figure 1:
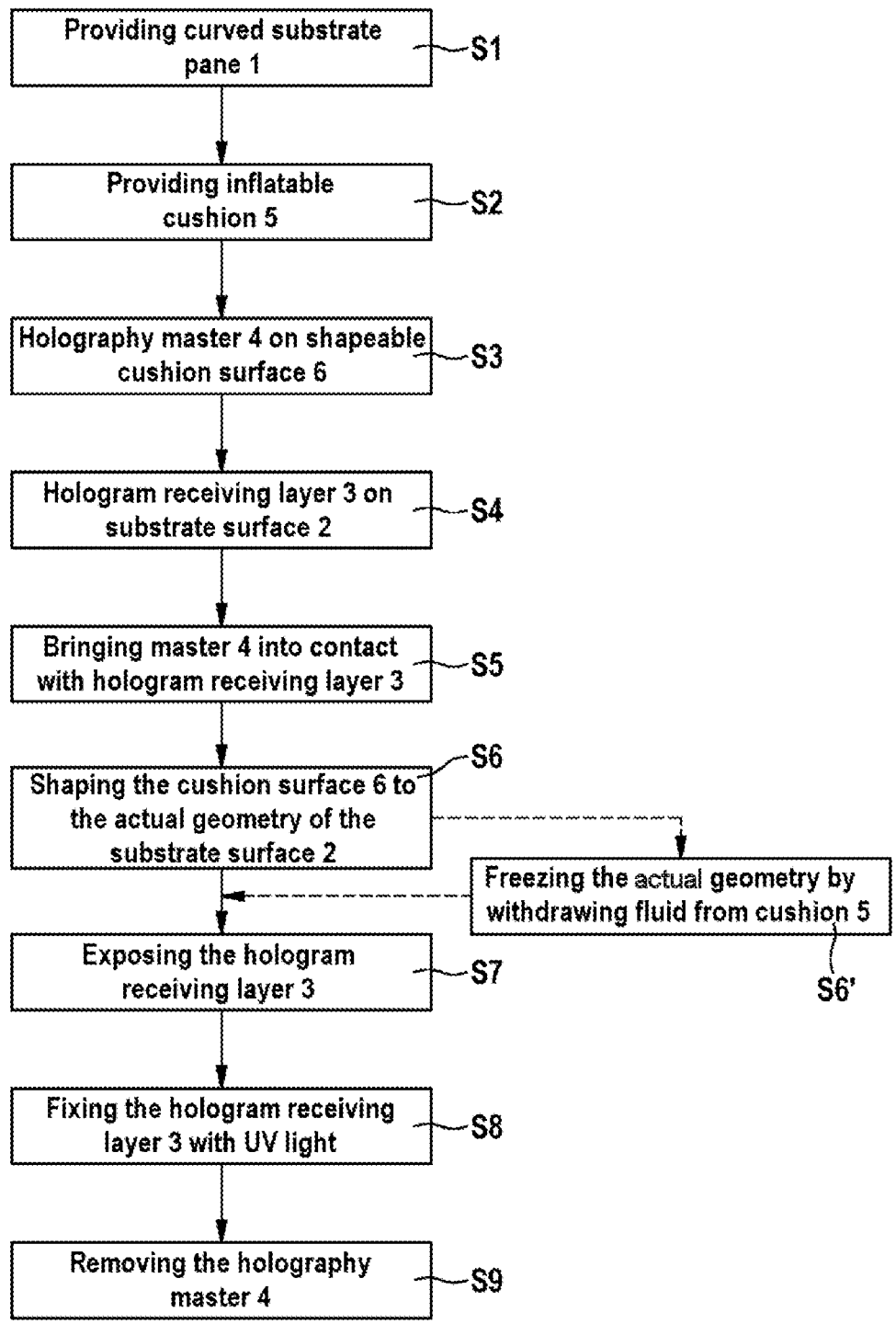
FIG. 1 shows a flow diagram of the method of the type set out herein for producing a hologram on a curved substrate pane.

FIG. 1 shows a flow diagram of the method according to the above first aspect of the invention for producing a hologram on a curved substrate pane which is elucidated hereinafter firstly with reference to the example illustrated in FIGS. 2a-2c for the first embodiment of this method described above.

Figure 2A:
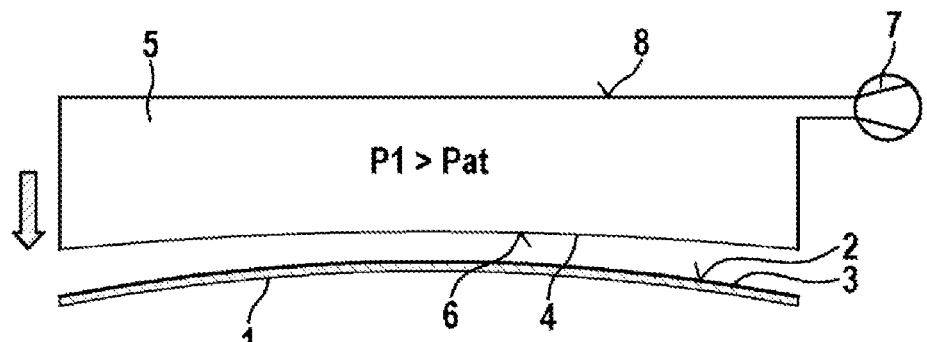
FIGS. 2a-2c show schematic lateral cross-sectional views of a curved substrate pane with hologram recording layer applied thereto and of an inflatable cushion used thereon for pressing on a holography master by way of elucidation of the shaping of the cushion to an actual geometry of the substrate pane in a first embodiment of the method of FIG. 1.
Figure 2B:
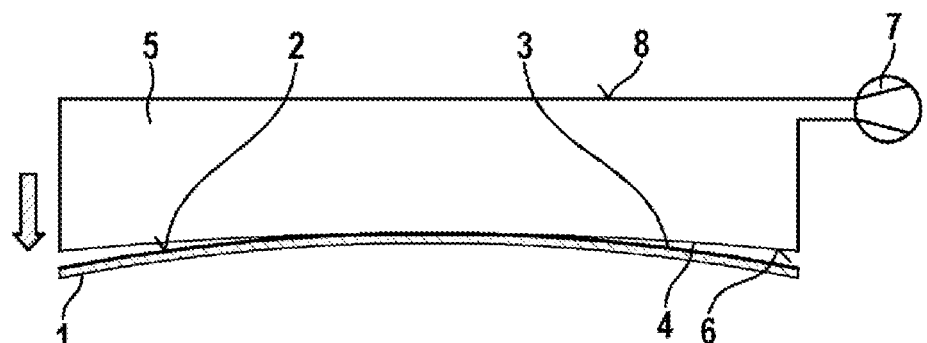
Figure 2C:
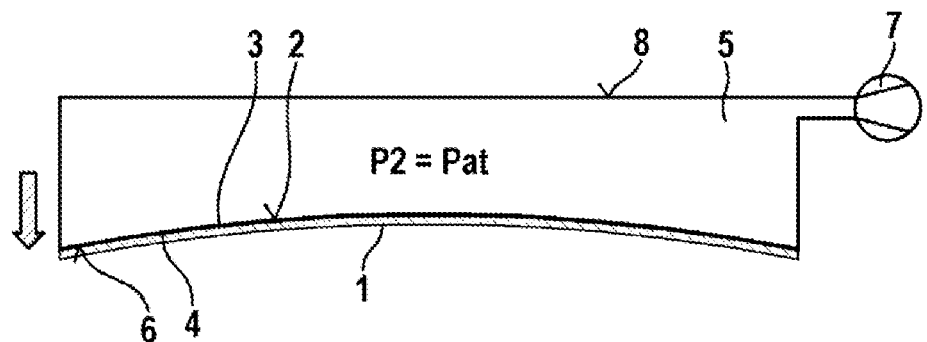

FIGS. 2a to 2c show, each in highly simplified schematic vertical cross-sectional views, three mutual arrangements, successive in the performance of the process according to FIG. 1, of a curved substrate pane 1 with a hologram recording layer 3 applied to the substrate surface 2 thereof, and of an inflatable cushion 5 used for pressing of a holography master 4 onto the hologram recording layer 3, by way of elucidation of the shaping of a cushion surface 6 brought about in the first embodiment to the actual geometry of the substrate surface 2 which is subject to a tolerance variation from the previously known target geometry.

In this example, the method according to FIG. 1 begins with a step S1 in which the three-dimensionally curved substrate pane 1 mentioned is provided, which is tolerance-affected as part of a future component, in this case a vehicle windowpane (not shown), and has a substrate surface 2 intended for hologram production, the actual geometry of which is subject to a tolerance variation with respect to a predetermined curved target geometry known in advance. The curved three-dimensional target geometry and actual geometry of the substrate surface 2 are distinctly different, as indicated in FIG. 2a for example, from a planar or flat surface form, and in this example corresponds to the 3-D shape of the future vehicle windowpane. The curved substrate pane 1 may be manufactured, for example, from glass or plastic and may especially be rigid.

In a further step S2, the inflatable cushion 5 is provided, the cushion surface 6 of which is shapeable by suitable action of pressure, and which has already been preshaped to the predetermined target geometry or with a predetermined variance therefrom, for example under- or overcambered. The inflatable cushion 5 may especially take the form of a polymer or elastomer balloon.

In the example shown in FIGS. 2a-2c, the inflatable cushion 5 is filled with a fluid, air in this example, and has a pressure regulation valve 7 for establishment of a fluid pressure in the cushion 5. As indicated schematically in FIG. 2a, the cushion 5 in step S2 is provided with a predetermined first fluid pressure P1, here a slightly elevated pressure compared to the existing ambient pressure (=atmospheric pressure) Pat, with the shapeable cushion surface 6 being overcambered with respect to the abovementioned known target geometry of the substrate surface 2.

In a further step S3, the holography master 4, which is, for example, a surface hologram that serves as a reusable negative of the hologram to be recorded, is applied in the form of a flexible thin layer to the shapeable cushion surface 6, such that the surface geometry of the flexible holography master 4 is the same as or defined by that of the shapeable cushion surface 6. For this purpose, the master 4 may especially also be bonded in a fixed manner to the flexible cushion surface 6, for example by way of a suitable adhesive or the like.

In a further step S4, a hologram recording layer 3, a liquid photopolymer layer in this example, is applied to the substrate surface 2.

Steps S1 to S4, for the example shown in FIGS. 2a-2c, may in principle be conducted in any sequence.

As shown in FIGS. 2a and 2b, in a further step S5, the holography master 4 applied on the shapeable cushion surface 6 is moved in the arrow direction indicated toward the substrate surface 2 and the hologram recording layer 3 applied thereto in order to lay on the holography master 4 and the hologram recording layer 3. As indicated in FIG. 2b, there is at first a distinct difference in the surface geometries of the holography master 4 on the one hand and of the thin hologram recording layer 3 on the other hand, which essentially follows the individual actual geometry of the substrate surface 2, such that the holography master 4 in FIG. 2b at first adjoins the hologram recording layer 3 only in places. As shown by FIG. 2b, the preshaped cushion surface 6 here is less curved than the substrate surface 2 in order to ensure that the first contact of the holography master 4 with the hologram recording layer 3 arises in about the middle of the substrate surface 2. In the present process, the latter is a particularly favorable starting prerequisite for the subsequent tolerance matching between the two contact surfaces, especially in order that the air can escape laterally outward in the establishment of full-area contact between them.

In order to ensure a hologram recording arrangement, as required for the forthcoming exposure process, with full-area contact between the holography master 4 and the hologram recording layer 3 at an essentially constant predetermined layer thickness of the hologram recording layer 3, therefore, in a further step S6, a balancing of geometry tolerances of the predetermined target geometry, in this example the preshaped cushion surface 6 which is slightly undercambered in this respect, is brought about with the holography master 4 applied thereto to give the individual actual geometry of the substrate surface 2 with the hologram recording layer 3 applied thereto.

As shown in FIG. 2c, this balancing of geometry tolerances in this example is brought about by contacting of the shapeable cushion surface 6 with the atmospheric pressure Pat, for example by the opening of the valve 7, while it is in contact with the hologram recording layer 3. In other words, after or during the laying of the holography master 4 on the hologram recording layer 3, the fluid pressure in the cushion 5 is altered to a predetermined second fluid pressure P2=Pat, which, in this example, is equal to the existing ambient pressure Pat. This change in pressure in the cushion 5 brings about the establishment of full-area contact between the holography master 4 with the thin hologram recording layer 3 that has been applied to the shapeable cushion surface 6, as a result of which the cushion surface 6 assumes the target geometry of the underlying substrate surface 2.

The compensation of geometry tolerances mentioned may especially be assisted by gentle pressure of the cushion 5 onto the substrate surface 2 by a force acting on the reverse side of the cushion 5. A compression force suitable for the purpose on the reverse side 8 of the cushion 5 may be applied, for example, by a mechanical device having spring action or the like (not shown).

This is followed, in a step S7, by the exposure of the hologram recording layer 3 in this hologram recording arrangement with a suitable coherent light, for example through the substrate pane 1, which creates the desired hologram in the hologram recording layer 3. Subsequently, the hologram recording layer 3, in a step S8, may be fixed with suitable UV light. The exposure and subsequent fixing with UV light cure the liquid photopolymer, after which the cushion 5 with the holography master 4 is removed from the completed substrate pane 1 with the hologram in a step S9.

Figure 3A:
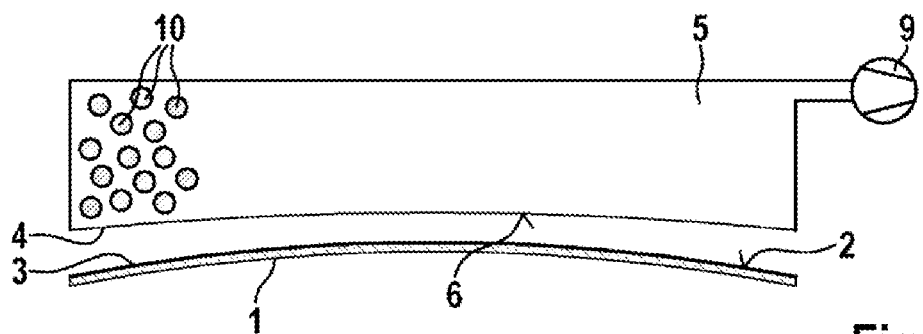
FIGS. 3a-3c show schematic lateral cross-sectional views of a curved substrate pane with hologram recording layer applied thereto and of an inflatable cushion used thereon for pressing on a holography master by way of elucidation of the shaping of the cushion to an actual geometry of the substrate pane in a second embodiment of the method of FIG. 1.
Figure 3B:
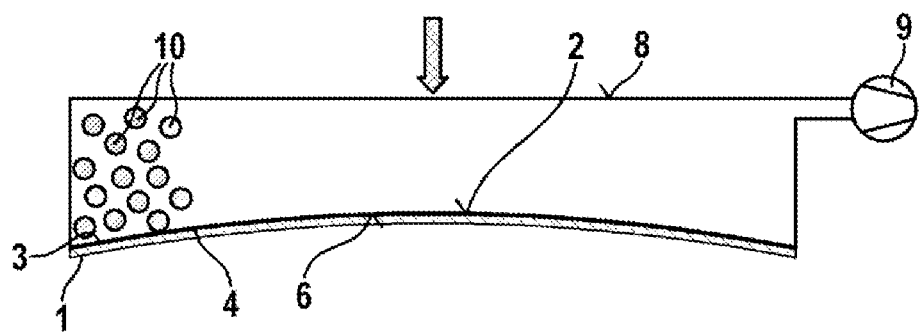
Figure 3C:
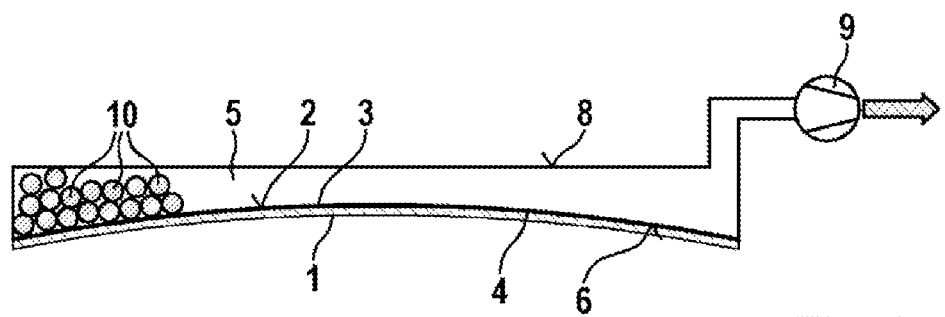

FIGS. 3a-3c show an example of the second embodiment, described further up, of the process of the type set out above. Similarly to FIGS. 2a-2c, FIGS. 3a-3c, each in greatly simplified schematic vertical cross-sectional views, show three mutual arrangements, successive in the performance of the process according to FIG. 1, of a curved substrate pane 1 with a hologram recording layer 3 applied to the substrate surface 2 thereof, and of an inflatable cushion 5 used for pressing of a holography master 4 onto the hologram recording layer 3, by way of elucidation of the shaping of a cushion surface 6 brought about in the second embodiment to the actual geometry of the substrate surface 2 which is subject to a tolerance variation from the previously known target geometry.

The main difference in the example shown in FIGS. 3a to 3c from that of FIGS. 2a-2c is solely the configuration of the cushion 5, and the manner of performance of the balancing of geometry tolerance which is required for the hologram recording arrangement of the type described herein between the preshaped cushion surface 6 and the individual actual geometry of the substrate surface 2. All that are described hereinafter are those steps of the method outlined in FIG. 1 that differ from the example according to FIGS. 2a-2c, while the other process steps may be identical and are therefore not repeatedly described in detail.

As shown in FIG. 3a, the inflatable cushion 5 provided in step S2 according to FIG. 1, in the second embodiment of the present process, is filled with a fluid, air in this example, and a solid-state material 10 distributed therein, loose granules of plastic for example in this example. When air is present in the cushion 5, the solid-state material 10 is soft and shapeable, such that the cushion surface 6 may, for example, be preshaped in a slightly undercambered manner with regard to the predetermined target geometry of the substrate surface 2 known in advance, and, during or after the application of the cushion surface 6 to the substrate surface 2, by virtue of the pressing on the reverse side of the cushion 5 with a suitable force in step S6, can assume the individual actual geometry thereof, as shown in FIG. 3b.

As shown by FIG. 3c, the geometry-balancing shape of the cushion surface 6 attained in step S6 (FIG. 3b), in the second embodiment of the invention, can be "frozen" in a subsequent optional step S6' by withdrawal of fluid from the cushion 5, evacuation by a vacuum pump 9 in this example, since the solid-state material 10 is compressed by the reduced pressure and keeps the shape imparted to it, provided that the cushion 5 is not refilled with air. More particularly, for this purpose, the abovementioned compression force applied for balancing of geometry tolerances on the reverse side 8 of the cushion 5 may be maintained during the evacuation.

The evacuated cushion 5 can thus retain the actual geometry, once attained, of its cushion surface 6 without further application of force, such as pressing on the reverse side with suitable force and the like; it is sufficient merely to place the cushion 5 with the holography master 4 applied thereto on the hologram recording layer 3 for establishment of full-area contact between them, observing the predetermined layer thickness of the hologram recording layer 3. This firstly facilitates precise compliance with the required hologram recording arrangement in the subsequent exposure step S7. Moreover, the balancing of geometries in this embodiment may therefore also be conducted prior to the above-described steps S3 and/or S4, i.e. prior to the application of the holography master 4 to the shapeable cushion surface 6 and/or prior to the application of a hologram recording layer 3 to the substrate surface 2.

LIST OF REFERENCE NUMERALS

1 curved substrate pane
2 substrate surface
3 hologram recording layer
4 holography master
5 inflatable cushion
6 shapeable cushion surface
7 pressure regulator valve
8 reverse side of the cushion
9 vacuum pump
10 solid-state material
P1 predetermined first fluid pressure
P2 predetermined second fluid pressure
Pat existing ambient pressure

The invention claimed is:

1. A method of producing a hologram on a curved substrate pane, the method comprising:
   providing the curved substrate pane with a substrate surface, an actual geometry of which is subject to a variance in tolerance compared to a predetermined target geometry;
   providing an inflatable cushion with a preshaped cushion surface which is shapeable by pressure and has been preshaped to the predetermined target geometry or with a predetermined variance from the predetermined target geometry;
   applying a holography master in a form of a flexible thin layer to the preshaped cushion surface;
   applying a hologram recording layer to the substrate surface;
   pressing or laying the holography master onto the hologram recording layer by way of the preshaped cushion surface shaped to the actual geometry, thereby achieving full-area contact between holography master and the hologram recording layer with an essentially constant predetermined layer thickness of the hologram recording layer; and
   exposing the hologram recording layer with a coherent light to form a hologram defined by the holography master in the hologram recording layer.

2. The method according to claim 1, wherein the hologram is a holographic optical element.

3. The method according to claim 1, wherein the hologram recording layer is a liquid photopolymer layer.

4. The method according to claim 1, wherein
   shaping of the preshaped cushion surface to the actual geometry before, during or after the pressing or laying of the holography master onto the hologram recording layer is brought about or assisted by pressing the preshaped cushion surface against the substrate surface with or without the hologram recording layer applied thereto with a compression force which is essentially constant over the entire preshaped cushion surface.

5. The method according to claim 4, wherein
   the shaping of the preshaped cushion surface to the actual geometry before, during or after the pressing or laying of the cushion with the holography master onto the hologram recording layer is brought about or assisted by pressing the cushion on a reverse side, with a force distributed uniformly over the reverse side, onto the substrate surface with or without the hologram recording layer applied thereto.

6. The method according to claim 4, wherein the inflatable cushion is filled with a fluid, comprises at least one pressure regulation valve for adjustment of a fluid pressure in the cushion, and is provided with a predetermined first fluid pressure at which the preshaped cushion surface has the predetermined target geometry or a predetermined variance from the predetermined target geometry, and
   the shaping of the preshaped cushion surface to the actual geometry is brought about by a change in fluid pressure in the cushion to a predetermined second fluid pressure during or after pressing of the cushion with the holography master applied thereto to the substrate surface with the hologram recording layer applied thereto.

7. The method according to claim 6, wherein the fluid is air.

8. The method according to claim 6, wherein
   the predetermined first fluid pressure is a reduced pressure or an elevated pressure in relation to an existing ambient pressure, and the predetermined second fluid pressure corresponds to the existing ambient pressure.

9. The method according to claim 4, wherein the inflatable cushion is filled with a fluid and a solid-state material which is present or distributed in the fluid, and which is shapeable in the fluid, hardens when the fluid is withdrawn from the cushion, and maintains a shape that can be imparted thereto, wherein
   the cushion with the preshaped cushion surface is provided at a predetermined fluid pressure;
   the shaping of the preshaped cushion surface to the actual geometry is brought about by the pressing of the cushion with or without the holography master applied thereto onto the substrate surface with or without the hologram recording layer applied thereto; and
   a shape imparted thereby to the preshaped cushion surface is fixed by withdrawal of fluid from the cushion.

10. The method according to claim 9, wherein the fluid is air.

11. The method according to claim 9, wherein the shaping of the preshaped cushion surface to the actual geometry comprises bringing about or assisting the pressing of the cushion onto the substrate surface by a force applied to a reverse side of the cushion.

12. The method according to claim 11, wherein the withdrawal of fluid from the cushion comprises bringing about or assisting the pressing of the cushion onto the substrate surface by the force applied to the reverse side of the cushion.

13. A curved substrate pane comprising:
the hologram produced on the curved substrate pane by the method according to claim 1, wherein
the hologram is formed within the hologram recording layer applied to the substrate surface, and
recording of the hologram is brought about by an exposure of the hologram recording layer with the coherent light in a hologram recording arrangement that exists for a duration of the exposure, in which the holography master in a form of a flexible thin layer is pressed onto the hologram recording layer with full-area contact between the holography master and the hologram recording layer, and an essentially constant predetermined layer thickness of the hologram recording layer by way of the inflatable cushion with the cushion surface corresponding to the actual geometry of the substrate surface.

14. The curved substrate plane according to claim 13, wherein the hologram is a holographic optical element.

15. The curved substrate pane according to claim 13, wherein the hologram is a volume hologram.

16. A composite pane comprising:
a first pane comprising the curved substrate pane with the hologram according to claim 13, and
a second pane bonded to the first pane by a bonding layer, wherein the hologram is formed on a surface of the first pane facing the second pane.

17. The composite pane according to claim 16, wherein the composite pane is a vehicle windowpane.

18. The composite pane according to claim 16, wherein the bonding layer is composed of PVB.

19. A vehicle comprising:
a vehicle windowpane at least partly formed by the composite pane according to claim 16, wherein
the first pane is an inner pane of the vehicle windowpane lying closer to or directly adjoining a vehicle interior, and the second pane is an outer pane of the vehicle windowpane lying closer or directly adjoining an exterior environment of the vehicle.

* * * * *